United States Patent

[11] 3,611,183

| [72] | Inventor | James R. Fendley, Jr.<br>Trenton, N.J. |
|---|---|---|
| [21] | Appl. No. | 793,935 |
| [22] | Filed | Jan. 27, 1969 |
| [45] | Patented | Oct. 5, 1971 |
| [73] | Assignee | RCA Corporation |

[54] DOUBLE-ENDED ION LASER TUBE
1 Claim, 3 Drawing Figs.

| [52] | U.S. Cl. | 331/94.5 |
|---|---|---|
| [51] | Int. Cl. | H01p 3/02 |
| [50] | Field of Search | 331/94.5 |

[56] References Cited
UNITED STATES PATENTS

| 3,172,057 | 3/1965 | Bennett | 331/94.5 |
|---|---|---|---|
| 3,363,196 | 1/1968 | Eknayan | 331/94.5 |
| 3,394,320 | 7/1968 | Medicus | 331/94.5 |
| 3,435,373 | 3/1969 | Wolff | 331/94.5 |
| 3,460,053 | 8/1969 | Leonard | 331/94.5 |
| 3,466,566 | 9/1969 | Patel | 331/94.5 |
| 3,478,279 | 11/1969 | Koboyashi et al. | 332/94.5 |
| 3,495,119 | 2/1970 | Kolb | 331/94.5 X |
| 3,501,713 | 3/1970 | Haisma et al. | 331/94.5 |
| 3,503,004 | 3/1970 | Haisma et al. | 331/94.5 |

OTHER REFERENCES

Bell: " Visible Laser Transistions in $Hg^+$ ," Applied Physics Letters, Vol. 4, pp. 34– 35, Jan. 1964.

Gordon et al: " Gas Pumping in Continuously Operated Ion Lasers," Bell System Technical Journal, Vol. 43, pp. 1827– 29, July, 1964.

Primary Examiner—Ronald L. Wibert
Assistant Examiner—Edward S. Baker
Attorney—Edward J. Norton ABSTRACT: Contamination of an optical element, such as a Brewster window, at the end of a high power gas discharge tube, which is presently due to the proximity of this optical element to the tube anode structure, is avoided by locating the anode structure centrally between the ends and employing two cathodes located respectively at the opposite ends of the tube. This results in significantly increasing the useful life of the gas discharge tube.

PATENTED OCT 5 1971
3,611,183
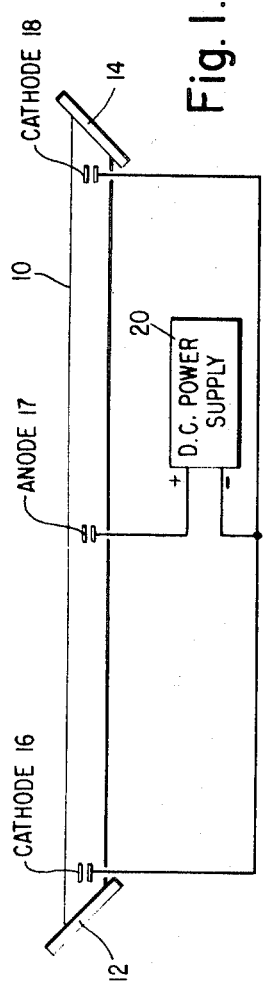
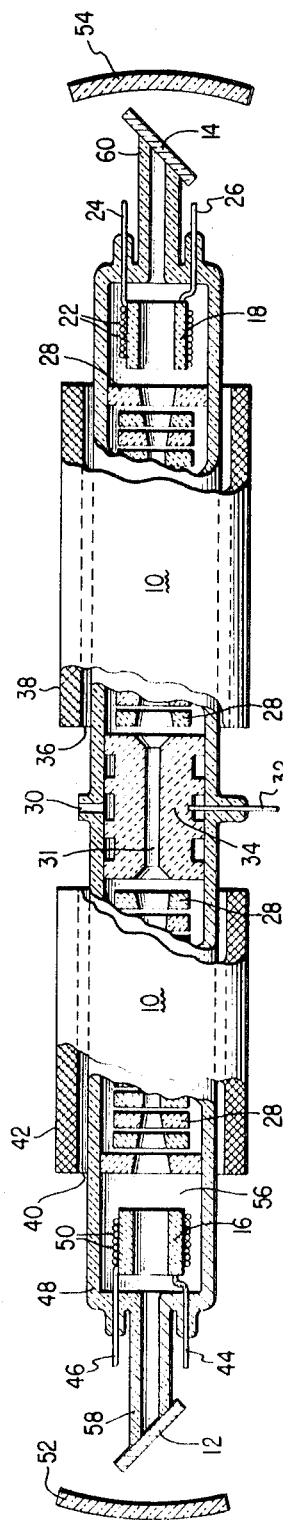
INVENTOR
James R. Fendley, Jr.
BY Edward J Norton
ATTORNEY

DOUBLE-ENDED ION LASER TUBE

The invention herein described was made in the course of or under a contract or subcontract thereunder with the Department of the Army.

This invention relates to gas lasers, and, more particularly, to a novel construction to prevent contamination of optical elements located within a gas discharge tube.

In the laser art, the trend has been to develop high powered gas lasers, e.g. in excess of 10 watts output power. However, these higher powers cause conditions which shorten laser life. One such condition is the bombardment of laser tube walls by high kinetic energy ions. As disclosed in my copending application Ser. No. 554,023 filed May 31, 1966, now U.S. Pat. No. 3,522,551, the use of graphite rings, which confine the plasma, alleviate this condition. The present invention is concerned with alleviating another condition which shortens the life of a high-power ion laser. This other condition results from the fact that contaminants are deposited on surfaces within the vicinity of the anode. In prior art gas lasers, the anode of the laser tube is located in the vicinity of one of the gas laser optical elements, such as a Brewster window or an internal mirror, as the case may be. In any case, this optical element near the anode will have its surface coated with contaminants resulting in shortened laser tube life.

Therefore, an object of the present invention is to provide a high power gas laser with a longer tube life than those of the prior art.

It is a more specific object to provide a novel anode-cathode-optical element relationship in a gas discharge tube to prevent undesired contamination of optical elements positioned within the gas tube.

According to the present invention, in a gas discharge tube, a tubular structure having first and second ends is provided. Within the tubular structure is a gas which emits light by stimulated emission when pumped by a discharge therethrough. Optical elements are positioned at each of the ends of the tube, the elements having a predetermined response to incident light and being in contact with the gas. There is provided an anode structure which is substantially removed from the vicinity of the optical elements and is positioned therebetween. A cathode structure is positioned within the tubular structure in the vicinity of at least one of the ends. A power supply for energizing the tube is coupled to the anode and cathode structures.

In one form, the anode structure is centrally located between the ends of and within the tubular structure. In another form, the tubular structure consists of three tubular sections joined end to end. The central tubular section may be made of a good electrical conductor and may be conductively coupled to at least one anode cylinder positioned within tubular structure in the vicinity of the central tubular member forming an anode structure therewith.

As a result of this novel structure, contaminants deposited in the vicinity of the anode structure are deposited only on the tubular structure and not on the optical elements. Therefore, increased laser life is provided.

These and other advantages will be more readily understood in conjunction with the description accompanying the following drawings:

FIG. 1 is a schematic diagram in accordance with the present invention.

FIG. 2 is a side elevation and partial cross section of one embodiment.

FIG. 3 is a partial side elevation and partial cross section of the anode area of a second embodiment.

Referring to FIG. 1, gas discharge tube 10 has Brewster windows 12 and 14 located at the ends thereto. Positioned at one end adjacent to window 12 is cathode structure 16 and at the opposing end adjacent to a window 14 is cathode structure 18. These cathode structures are coupled together and connected to the negative terminal of DC power supply 20. Located between the two windows and substantially removed therefrom, is anode 17 which is coupled to the positive terminal of DC power supply 20.

In the embodiment of FIG. 2, gas discharge tube structure 10 comprises tube 48 which extends approximately 8 feet from first end 58 to second end 60. Brewster windows 12 and 14 are located at ends 58 and 60, respectively. Tube 48 and windows 12 and 14 form a sealed chamber as known in the art. Surrounding tube 48 are two sections 36 and 40 of a conventional water cooling jacket, each encasing the tube. Surrounding the cooling jackets are two separate conventional coils 38 and 42. These coils create axial magnetic fields within the tube to enhance the laser output. Within tube 48 are graphite discs 28, the subject of copending application Ser. No. 554,023, which confine the plasma and reduce ion bombardment of the tube walls, thereby substantially increasing tube life.

At end 58, in the vicinity of window 12, is cathode ring 16. Surrounding cathode 16 is heater coil 50. Lead 46 is conductively coupled to heater coil 50 and lead 44 is conductively coupled to cathode 16. Leads 44 and 46 also provide structural support for cathode 16.

Similarly, at opposing end 60, near window 14, is cathode ring 18, heater coil 22, and leads 24 and 26 for the heater coil and cathode, respectively.

Anode structure 34 is positioned substantially centrally between ends 58 and 60, removed a considerable distance from the vicinity of optical elements such as windows 12 and 14.

The optical elements referred to in this application, such as Brewster windows or internal laser mirrors, have a predetermined response to incident light, i.e. they have a predetermined ability to transmit or reflect incident light. When contaminants become deposited on the surfaces of these elements, the response of the elements to incident light deteriorates due to absorption or scattering of the light. It is this deterioration of the predetermined response which shortens gas laser life at higher powers. Consequently, by removing the anode from the vicinity of the optical elements, this condition is alleviated. For example, in this embodiment, the anode is approximately 4 feet from the optical elements. By so positioning the anode, contaminants, which are deposited in the vicinity thereof, are deposited harmlessly in an area removed from the location of these optical elements.

In FIG. 2, the anode may be an elongated graphite cylinder having a bore 31, but, of course, could also be made of other electrically conductive materials. Bore 31 runs axially through the longitudinal axis of anode 34. Together with the remainder of the components within the tube structure, the bore completes the optical path between windows 12 and 14. Terminal 32 facilitates coupling anode 34 to DC power supply 20. A conventional gas port 30 is provided for connection to a gas reservoir (not shown). A noble gas, such as argon, is normally used to fill tube 48.

External mirrors 52 and 54 are adjacent the ends 58 and 60 of tube structure 10, forming a resonant optical cavity as known in the art. Although not shown, internal mirrors could be substituted for the Brewster windows and external mirrors. Coupled to cathode leads 26 and 44 is DC power supply 20.

Another embodiment of the invention is shown in FIG. 3. The difference between this structure and that shown in FIG. 2 lies in the area of the anode configuration, therefore, just this section is shown in FIG. 3. The remainder of the tube structure omitted from FIG. 3 is identical to that shown in FIG. 2.

Referring now to FIG. 3, there is shown three tubular sections which comprise tube structure 10. Tubular section 45 may be similar to tubular section 47. The third tubular section may be corrugated metal tube 37 which may be axially flexible. Tubular section 37 may be substantially shorter than sections 45 and 47. For example, sections 45 and 47 may be 4 feet each while section 37 may be a few inches. Section 37 may be approximately the same diameter as sections 45 and 47, but of course, could be other sizes as well. One end of section 37 is sealed to one end of tube 45 and the other end of section 37 is sealed to one end of tube 47. Thus, tubular sections 45, 37, and 47 together form a complete, continuous tubular structure. The other ends of tubular sections 45 and 47 terminate at windows 12 and 14, respectively, as shown in FIG. 2. The corrugation of section 47 allows section 37 to be flexible, permitting sections 45 and 47 to be axially aligned. Therefore, a precise axial optical path between the other ends of section 45 and 47 (ends 58 and 60 of FIG. 2) may be achieved. Since long tubes may be used in high-powered gas lasers, it is advantageous to fabricate the tube in sections and align these sections thereafter.

Section 37 is substantially centrally located between the ends (not shown) of sections 45 and 47 corresponding to ends 58 and 60 of FIG. 2.

The anode structure consists of elongated cylinder 35 positioned in tubular section 45 and a similar cylinder 39 positioned in tubular section 47, both cylinders being within the vicinity of central section 37. Being thus positioned, the two anode cylinders are substantially removed from the vicinity of Brewster windows 12 and 14. For example, in this embodiment, the anodes are approximately 4 feet from either Brewster window. Comparison of this embodiment with that shown in FIG. 2 reveals the similarity of the anode-cathode-optical elements relationship.

The anode cylinders of FIG. 3 are made preferably of graphite and have a bore 31 along the longitudinal axis. In member 37 is conventional gas port 29. Tubular sections 45 and 47 of FIG. 3 may be made of quartz as may be tube 48 of FIG. 2.

Coupling anode cylinders 35 and 39 to good electrical conductor member 37 are conductors 43. Terminal 33 is conductively connected to section 37 for facilitating coupling the anode cylinders to DC power supply 20. Other means, of course, could be provided to couple anode cylinders 35 and 39 to DC power supply 20.

As readily seen in FIGS. 2 and 3, when sections 45 and 47 are substantially great in length, for example, 4 feet each, as compared, for example, to a few inches in length of section 37, or, when tube 48 is 8 feet in length, windows 12 and 14 at the extremities of tubular structure 10 are substantially beyond the vicinity of the centrally located anode structure. In this case, the optical elements will be several feet from the anode structure as compared to a few inches in the prior art. Thus, contaminants, deposited in the vicinity of the anode structure, are deposited harmlessly on the cold tube away from optical elements such as windows 12 and 14.

A result of this novel construction is a much longer window life than has heretofore been experienced in gas discharge tubes of this type.

What is claimed is:

1. In a noble gas ion laser discharge tube of the type including a gas-filled tubular structure having disposed therein at least one anode electrode centrally located between two cathode electrodes and spaced from each cathode electrode by several feet, and further including two optical elements in contact with said gas which are positioned respectively at opposite ends of said tube, said elements having a predetermined response to incident light, said gas including a desired given primary gas together with an unwanted contaminated portion, solely the contaminated portion being of the type which is deposited on any inner surface of said tube which is situated solely within a given distance from said anode in response to a gas discharge between said electrodes; the improvement wherein said anode electrode is disposed entirely beyond said given distance from either of said optical elements, whereby coating of said optical elements by said contaminants is prevented.